March 28, 1933. W. WAGNER 1,902,884
MAP DISPLAY DEVICE FOR MOTOR VEHICLES
Filed Nov. 9, 1931  6 Sheets-Sheet 2
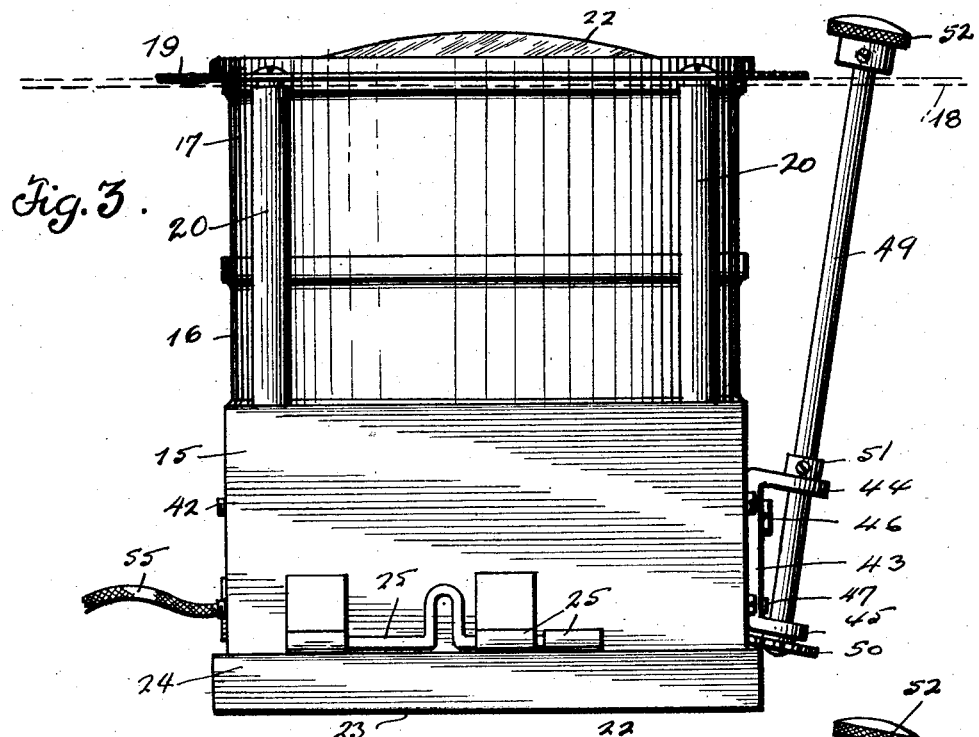
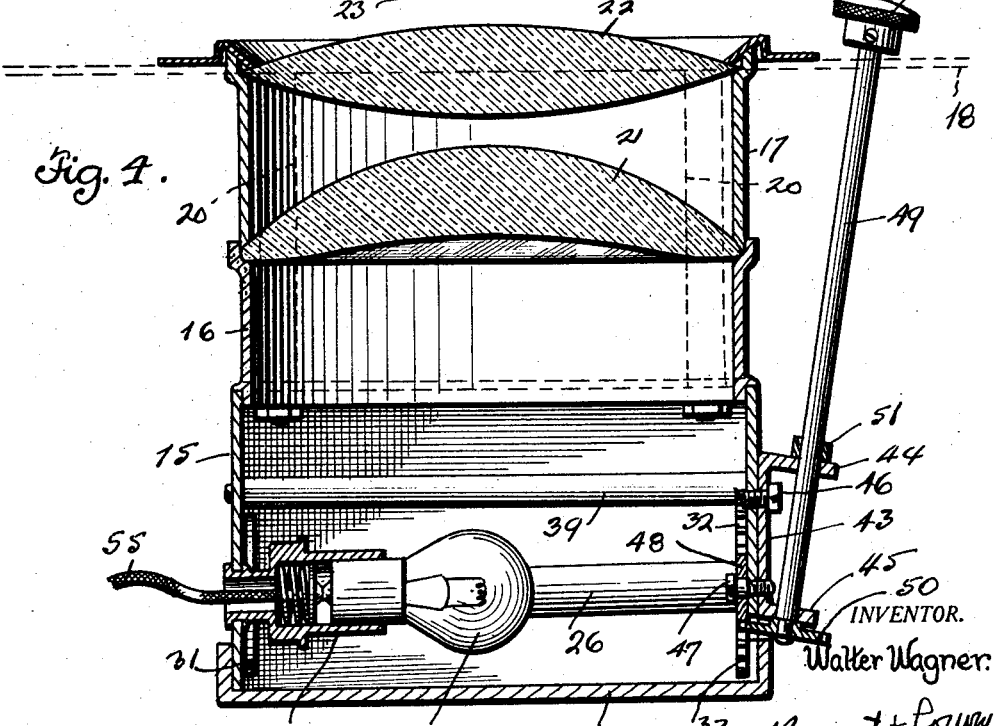
INVENTOR.
Walter Wagner.
Bryant & Lowry
ATTORNEYS.

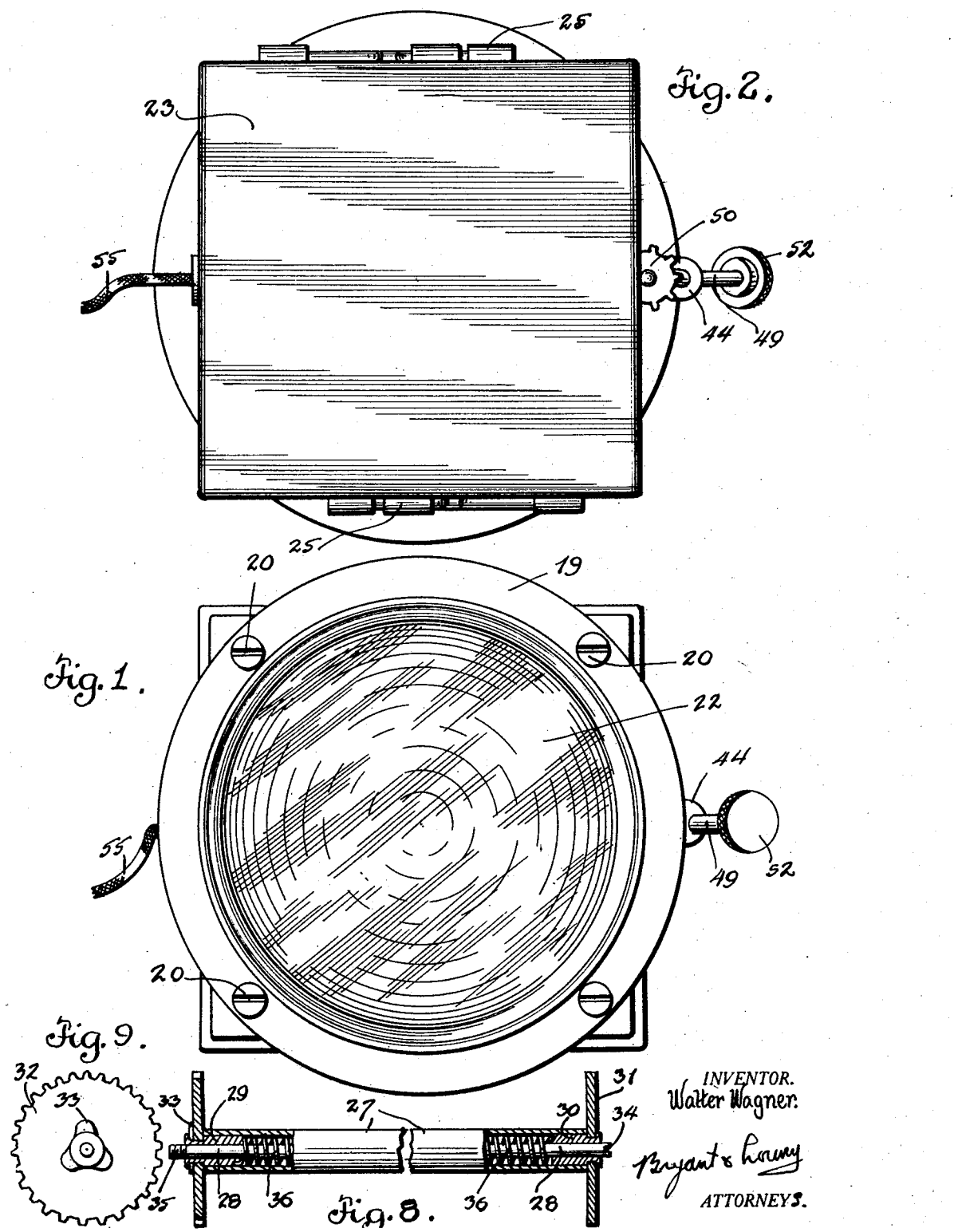

March 28, 1933.  W. WAGNER  1,902,884
MAP DISPLAY DEVICE FOR MOTOR VEHICLES
Filed Nov. 9, 1931    6 Sheets-Sheet 3
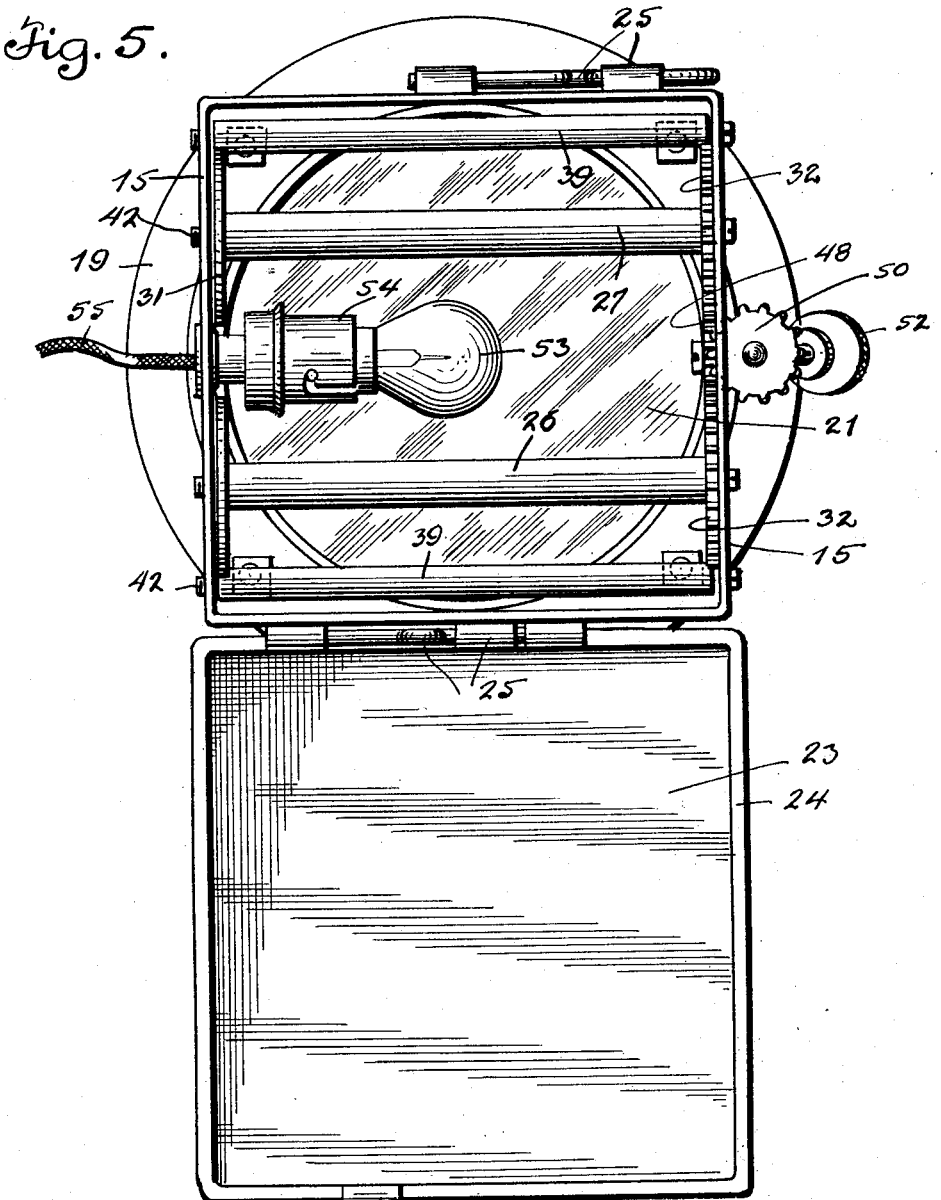
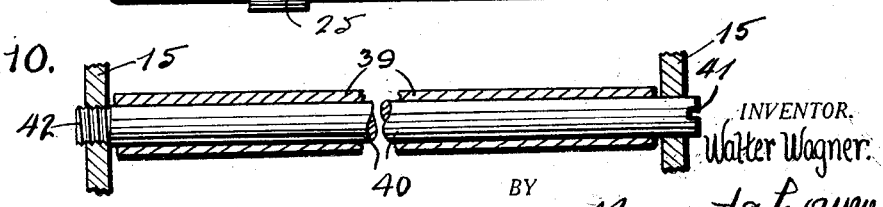
INVENTOR.
Walter Wagner.
BY Bryant & Lowry
ATTORNEYS INVENTOR.
Walter Wagner.
BY Bryant & Lowry
ATTORNEYS.

March 28, 1933.  W. WAGNER  1,902,884
MAP DISPLAY DEVICE FOR MOTOR VEHICLES
Filed Nov. 9, 1931   6 Sheets-Sheet 5
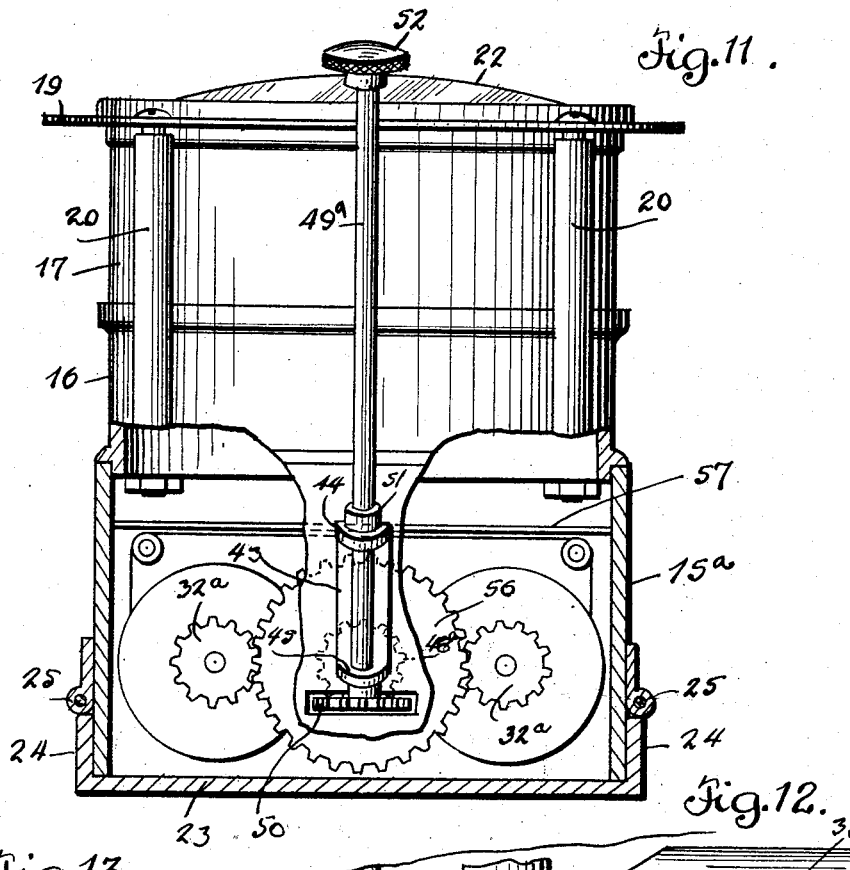
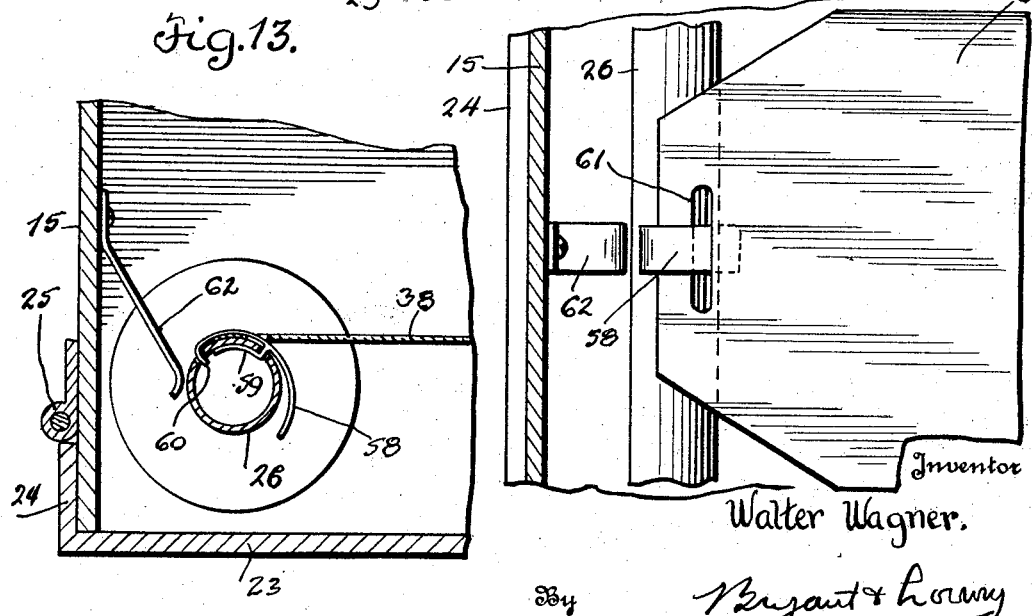
Inventor
Walter Wagner.
By Bryant & Lowry
Attorneys.

Inventor
Walter Wagner.
By Bryant & Lowry
Attorneys

Patented Mar. 28, 1933

1,902,884

UNITED STATES PATENT OFFICE

WALTER WAGNER, OF PARK RIDGE, ILLINOIS

MAP DISPLAY DEVICE FOR MOTOR VEHICLES

Application filed November 9, 1931. Serial No. 574,013.

This invention relates to new and useful improvements in map display devices for motor vehicles.

The primary object of the invention is to provide a map display device carried by an automobile or airplane with a strip map or tape wound at opposite ends upon drums with the intermediate run thereof traveling beneath magnifying lenses to be viewed by the operator of automobile, airplane or other persons with feeding means for the map strip that may be either manual, electrical or automatically operated.

A further object of the invention is to provide a map display device of the foregoing character wherein the map may be of any character described for displaying different State routes, city guides, or other information incident to travel, the device being in the form of a casing, preferably carried by the instrument board of the automobile with magnifying lenses overlying the map and with illuminating means disposed beneath the map.

With the above and other objects in view that will become apparent as the nature of the invention is better understood, the same consists in the novel form, combination, and arrangement of parts hereinafter more fully described, shown in the accompanying drawings and claimed.

Figure 6:
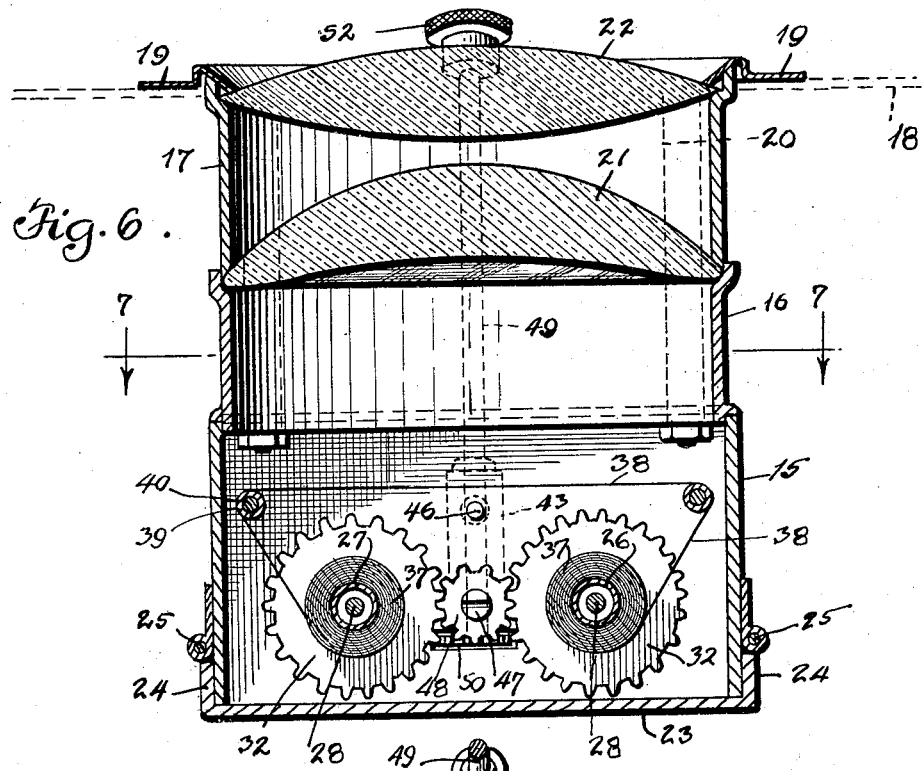
Figure 7:
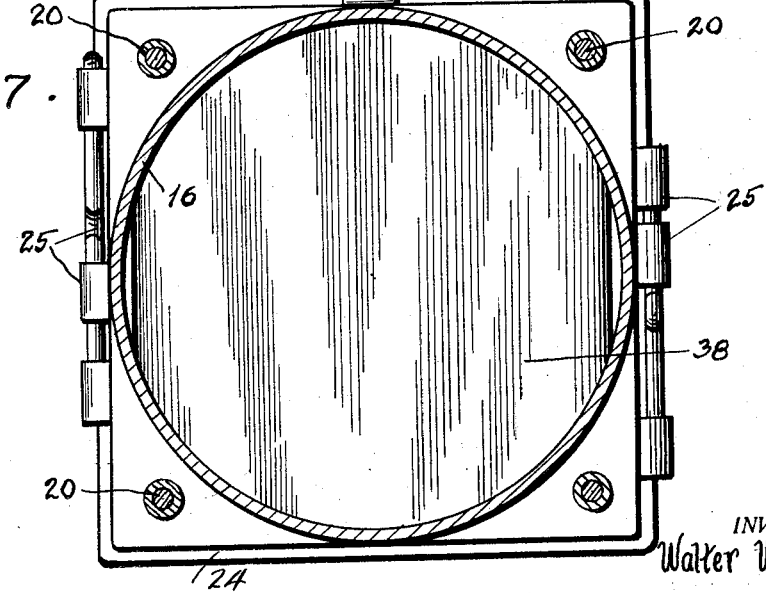
Figure 14:
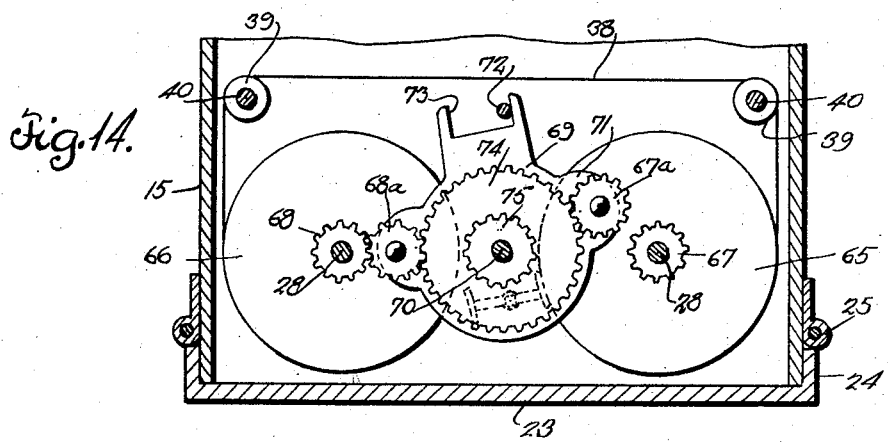
Figure 15:
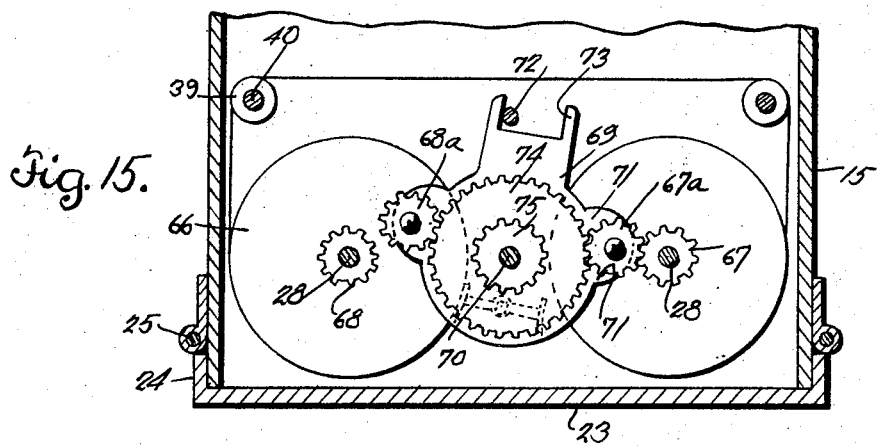
Figure 16:
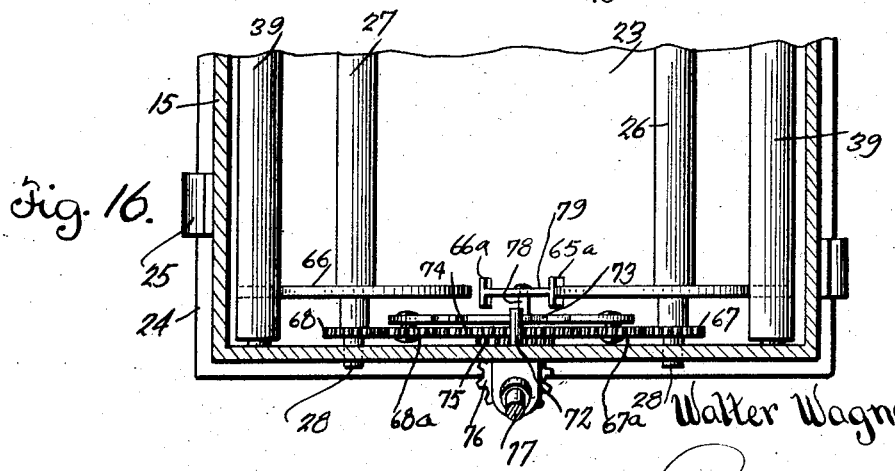

In the drawings, forming a part of this application and to which reference is had by like characters designating corresponding parts throughout the several views, Figure 1 is a top plan view of a map display device constructed in accordance with the present invention, Figure 2 is a bottom plan view, Figure 3 is a side elevational view showing the display device mounted upon the instrument board of an automobile that is illustrated by dotted lines, with the device positioned rearwardly of the instrument board, Figure 4 is a vertical cross-sectional view showing the magnifying lenses in the casing of the device and the illuminating means in the lower end thereof, Figure 5 is a bottom plan view with the bottom wall in open position to disclose the gear drive for the drums that support the map strip, Figure 6 is a vertical cross-sectional view taken at right angles to the sectional view shown in Figure 4, illustrating the gear drive for the map reels with the map strip beneath the reels passing below the magnifying lenses, Figure 7 is a cross-sectional view taken on lines 7—7 of Figure 6, Figure 8 is a side elevational view partly in section of one of the map drums having a spring associated therewith for tensioning the map strip, Figure 9 is an elevational view of one of the gears carried by a map drum, Figure 10 is a detail sectional view of one of the guide rollers for the map strip, Figure 11 is a side elevational view, partly broken away for the inspection of another form of the display device embodying another construction of gear drive for the map drum, Figure 12 is a detail sectional view showing the manner of attaching one end of the map strip to a map drum, Figure 13 is a detail sectional view showing the spring device carried by the map drum to which the map strip is attached, Figure 14 is a detail vertical sectional view through the casing showing another form of drive for the map reels with a gear drive for one drum and a brake device for the other drum, Figure 15 is a detail sectional view similar to Figure 14 showing the parts in reversed position, and Figure 16 is a horizontal sectional view of the apparatus shown in Figure 13.

Referring more in detail to the accompanying drawings, there is illustrated a road map display device for use on automobiles or airplanes comprising a casing as illustrated in Figures 6 and 7 that is formed of a rectangular base portion 15 and a cylindrical upper portion comprising cylindrical sections 16 and 17, the device being set into the instrument board 18 of an automobile that is illustrated by dotted lines and retained in position thereon by a ring flange 19 in cooperation with tie bolts 20 that also act to hold the parts of the casing in assembled relation. A pair of magnifying lenses 21 and 22 is carried in the cylindrical portion of the casing, the lens 21 being supported at its edges at the juncture of the casing sections 16 and 17, while the outer lens 22 is retained in position by the ring flange 19 as illustrated in Figure 6.

The lower open side of the casing is closed by a bottom wall 23 having edge flanges 24 inclosing the lower edges of the base section 15 of the casing and opposite flanges 24 of the cover 23 have sliding pin hinge connections 25 with the base section 15, whereby either hinge connection may be released to permit the bottom wall to be moved to open position as illustrated in Figure 5 for access to the interior mechanism of the casing.

A pair of map drums 26 and 27 is journaled between side walls of the base section 15 of the casing, each drum as shown in Figure 6 being of tubular formation, and as shown in Figure 8, comprising a central shaft 28 set in bearing blocks 29 and 30 in the ends of the tubular map drums, the bearing 30 carrying at its outer end a drum flange 31 while the bearing 29 carries at its outer end a gear wheel 32 frictionally engaged with the bearing 29 and adjacent end of the drum 27 by the spring device 33. One end of the shaft 28 is fashioned as at 34 to receive a key while the other end thereof is threaded as at 35 for threaded engagement with a side wall of the casing 15. The map drums 26 and 27 with the shaft 28 removed therefrom are positioned in the base section 15 of the casing and the shafts 28 are then passed through the tubular drums with a key engaged with the end 34 thereof to thread the opposite end of the shaft into the opposite wall of the casing as illustrated in Figure 5. The tubular drum 27 as shown in Figure 8 incloses a spring 36 that surrounds the shaft 28, being anchored at one end to the block 29 with the other end thereof anchored to the drum 27 and block 30 for tensioning the map strip wound thereon. The map 37 is wound upon tubular drums 26 and 27 and the strip or run 38 between the drums 26 and 27 passes through the casing 15 beneath the magnifying lenses 21 and 22, the strip or run 38 of the map passing over guide rollers 39 shown in detail in Figure 10 as comprising an outer bearing sleeve and an inner shaft 40 having one end keyed as at 41 and the other end threaded as at 42 for assembly in the walls of the casing section 15 as described in connection with the map drums 26 and 27, and if desired, the guide rollers 39 may be formed of friction material to prevent slippage of the map strip.

A bracket plate 43 comprising angle bearing arms 44 and 45 is secured exteriorly of section 15 of the casing at a point between the ends of the drums that carry the gears 32, the bracket plate 43 being secured in position by a pair of screws 46 and 47, the screw 47 having the headed end thereof disposed within the casing and carrying a bearing portion for a pinion 48 that meshes with the adjacent gear wheels 32 as shown in Figure 6. An operating shaft 49 is journaled in the angle arms 44 and 45 of the bracket plate 43 and carries at its outer end adjacent the arm 45, a gear 50 that is in meshing engagement with the pinion 48. The gear 50 is retained operatively positioned relative to the pinion 48 by the collar 51 secured to the shaft 49 adjacent the bracket arm 44. The other end of the shaft 49 extends through the instrument board 18 and has an operating knob 52 thereon. However, it is to be understood that other devices may be employed for operating the map drums, which may be of an electrical, mechanical or automatic nature, such as being operated by a motor or in communication with a moving part of the automobile.

Illuminating means for the map strip is arranged in the bottom of the device, preferably between the map drums and below the map strip or run 48, there being shown in Figures 4 and 5 a lamp 53 set into a socket 54 carried by a wall of the base section 15 of the casing with a conductor 55 from a source of potential in communication with the socket 54.

In the form of invention shown in Figure 11, a modified construction of gear drive is illustrated, each map drum carrying a pinion 32$^a$ that is engaged by a relatively large gear 56 that is fixed to a shaft that carries the pinion 48$^a$ that is in meshing engagement with the gear 50$^a$ upon the operating shaft 49$^a$. This arrangement provides increased speed of movement of the map strip or run through the casing and side flanges 57 on the casing section 15$^a$ constitute guides for the map strip or run.

As shown in Figures 12 and 13, the end of the map strip has a spring clip connection with the map drum and a spring arm carried by the casing is engaged with the map 37 upon the drums 26 and 27 to maintain the wound map in a taut and tight condition, the spring clip connection for the end of the map strip comprising a spring arm 58 of arcuate form extending circumferentially of the drums 26 and 27 with a pair of inwardly directed hooks 59 and 60 projected through openings in the drums, the end of the map strip 38 being slotted as at 61 for passage of the hook 60 before the latter passes into the tubular drum, this arrangement being clearly illustrated in Figure 13. The drum 26, as illustrated in Figure 13, when rotated in a counter-clockwise direction causes the map strip 38 to be wound thereon and overlie the spring arm 58 for the tensioning of the map strip, the spring arm 62 carried by the casing section 15 having its free end disposed adjacent the drum 26 for tensioning the map roll 37.

As previously described, the gear wheel 32 associated with the map drum 27 is frictionally engaged with one end thereof and said map drum 27 carries the tensioning spring 36, the tensioning spring 36 working in opposition to the gear wheel 32 so that when the map strip or run is being transferred from one map drum to the other map drum and the wound map strip upon the drums change in diameters during winding operation, slack in the map strip or run is eliminated by the tensioning spring 36 and by reason of the fact that the gear wheel 32 may slip or advance relative to the drum 27 so that the map strip or run is always maintained in a taut condition. To compensate for the varying diameters of the rolled map strip upon the two drums, another form of gear drive is provided for the map drums as illustrated in Figures 14 to 16 wherein the casing structure is the same as disclosed in connection with the other forms of the invention, the map drums 26 and 27 being fixed to center bearing shafts 28 that are journaled in the side walls 15 of the lower end of the casing. Each of the drums 26 and 27 carries the usual drum flanges 65 and 66, respectively, while the shafts 28 supporting the drums carry pinions 67 and 68. A rocker plate 69 is pivotally supported upon the stub shaft 70 mounted in a side wall of the casing in horizontal alinement with the drum shafts 28 and diametrically opposite outwardly directed ears 71 carried by the rocker plate 69 rotatably support pinions 67ª and 68ª that are selectively movable into meshing engagement with the pinions 67 and 68 as illustrated in Figures 14 and 15, the rocker plate being limited in its movements by the pin 72 projecting inwardly from the adjacent side wall of the casing and extending into the forked upper end 73 of the rocker plate. The driving mechanism for the pinion 67ª and 68ª includes a relatively large gear 74 journaled upon the stub shaft 70 in meshing engagement with said pinions and a relatively smaller pinion 75 on the shaft 70 and fixed to the gear 74 that is engaged by the angularly disposed pinion 76 upon the lower end of the operating rod 77. When one of the drums is positively driven by the gear mechanism for winding the map strip thereon, the other drum rotates freely and to retard unwinding movement of the free drum so that the map strip will be maintained in a taut condition, there is provided a brake device to retard such movement. The brake device is carried by the rocker plate 69 and includes a pin 78 projecting facially from the rocker plate at the side thereof opposite the gear 74 with a cross head 79 fixed to the outer end of the pin and carrying at opposite ends thereof brake shoes 65ª and 66ª respectively.

When the rocker plate 69 is in the position shown in Figures 14 and 16, the gear mechanism is engaged with the map drum 27, the pinion 67ª of the gear mechanism being then disengaged from the pinion 67 upon the map drum 26 to permit free rotation of the latter while the map strip is being wound upon the map drum 27, the free rotation of the map drum 26 being retarded by the brake shoes 65ª that is engaged with the flange 65 thereof so that the map strip is always maintained in a taut condition. The reversed position of the gear mechanism is shown in Figure 15, the map drum 26 being then positively driven while the map drum 27 freely rotates under the retarding influence of the brake shoe 66ª engaged with the flange 66 thereof.

It is to be understood that the map element of the device may carry descriptive matter of different States and be interchangeable with maps carrying State information as well as city guides or routes, and that the device may be electrically, automatically or hand operated. Suitable switch devices control illumination of the lamp 53 and the map may be of a material permitting illumination thereof, such as transparent or translucent and the magnifying lenses 21 and 22 in the casing sections 16 and 17 greatly enlarge the map data. As illustrated, the map drums 26 and 27 are rotated by the gear train connection with the operating handle 49 that conveniently extends through the instrument board 18 of the motor vehicle. Access to the interior of the casing is accomplished by hingedly opening the bottom wall 23 and the map drums may be removed for replacement by first removing the shafts 28 in the drums and the shafts 40 in the guide rollers 39.

While the forms of the invention herein shown and described are what is believed to be the preferred embodiments thereof, it is nevertheless to be understood that various forms, modifications, and arrangement of the parts may be made without departing from the spirit and scope of the invention as claimed.

I claim:—

1. In a map display device of the character described, a casing, magnifying lenses set into one end of the casing, a pair of map drums journaled in the casing below the lenses with the strip run of the map traversing the lenses, illuminating means in the casing inwardly of the strip run, gear connections between the map drums and operating means for the gear connections disposed exteriorly of the casing, and including a bracket plate on the outer side of the casing having angle arms, a shaft journaled in said angle arms, a gear on said shaft and said casing having an opening therein through which the last named gear extends for communication with the gear connections between the map drums.

2. A map display device adapted for mounting in the instrument board of an automobile, comprising a casing, magnifying lenses at the upper end of the casing, map drums journaled in the lower end of the casing with the strip run of the map traversing the lenses, operating means for the drums, and, each map drum including a tubular member having a plug in each end with a bearing opening in each plug, a bearing shaft extending through the plugs and having one end thereof removably secured to a wall of the casing.

3. A map display device adapted for mounting in the instrument board of an automobile, comprising a casing, magnifying lenses at the upper end of the casing, map drums journaled in the lower end of the casing with the strip run of the map traversing the lenses, operating means for the drums, and, each map drum including a tubular member having a plug in each end with a bearing opening in each plug, a bearing shaft extending through the plugs and having one end thereof removably secured to a wall of the casing, a flange at one end of the drum secured to the plug and a spring device for retaining the gear frictionally engaged with the other end of the drum.

4. In a map display device of the character described, a casing, magnifying lenses set into one end of the casing, a pair of map drums journaled in the casing below the lenses with the strip run of the map traversing the lenses, illuminating means in the casing inwardly of the strip run, operating means for the drums, and, said casing comprising a rectangular base portion in which the map drums are journaled and an upper sectional cylindrical portion with one lens secured at the meeting edges of the sections and the other lens positioned at the upper end of the upper section.

5. In a map display device of the character described, a casing, magnifying lenses set into one end of the casing, a pair of map drums journaled in the casing below the lenses with the strip run of the map traversing the lenses, illuminating means in the casing inwardly of the strip run, operating means for the drums, the connections between the map drums and ends of the map including spring arms carried by the drums to which the map ends are attached with the map rolled upon the drums in inclosing relation relative to the spring arms.

6. Map display apparatus of the character described comprising a casing, a pair of map drums journaled therein, an end flange and pinion on each drum, a rocker plate, gear mechanism on the rocker plate for selective engagement with the drum pinions and a brake device on the rocker plate engageable with the flange of the drum that is disconnected from the gear mechanism.

7. Map display apparatus of the character described comprising a casing, a pair of map drums journaled therein, an end flange and pinion on each drum, a rocker plate, gear mechanism on the rocker plate for selective engagement with the drum pinions and a brake device on the rocker plate engageable with the flange of the drum that is disconnected from the gear mechanism, said rocker plate being manually shiftable and operating means for the gear mechanism positioned exteriorly of the casing.

8. Map display apparatus of the character described comprising a casing, a pair of map drums journaled therein, an end flange and pinion on each drum, a rocker plate, gear mechanism on the rocker plate for selective engagement with the drum pinions and a brake device on the rocker plate engageable with the flange of the drum that is disconnected from the gear mechanism, the gear mechanism including a pinion journaled adjacent opposite edges of the rocker plate for selective engagement with the drum pinions, a relatively large gear journaled on the rocker arm constantly engaged with the pinions on the rocker arm and a pinion axially fixed to the large gear.

9. Map display apparatus of the character described comprising a casing, a pair of map drums journaled therein, an end flange and pinion on each drum, a rocker plate, gear mechanism on the rocker plate for selective engagement with the drum pinions and a brake device on the rocker plate engageable with the flange of the drum that is disconnected from the gear mechanism, said rocker plate being manually shiftable and operating means for the gear mechanism positioned exteriorly of the casing, the gear mechanism including a pinion journaled adjacent opposite edges of the rocker plate for selective engagement with the drum pinions, a relatively large gear journaled on the rocker arm constantly engaged with the pinions on the rocker arm and a pinion axially fixed to the large gear.

In testimony whereof I affix my signature.

WALTER WAGNER.